April 16, 1940.    R. H. FLUTSCH ET AL    2,197,686
FLOAT VALVE
Filed Aug. 23, 1938
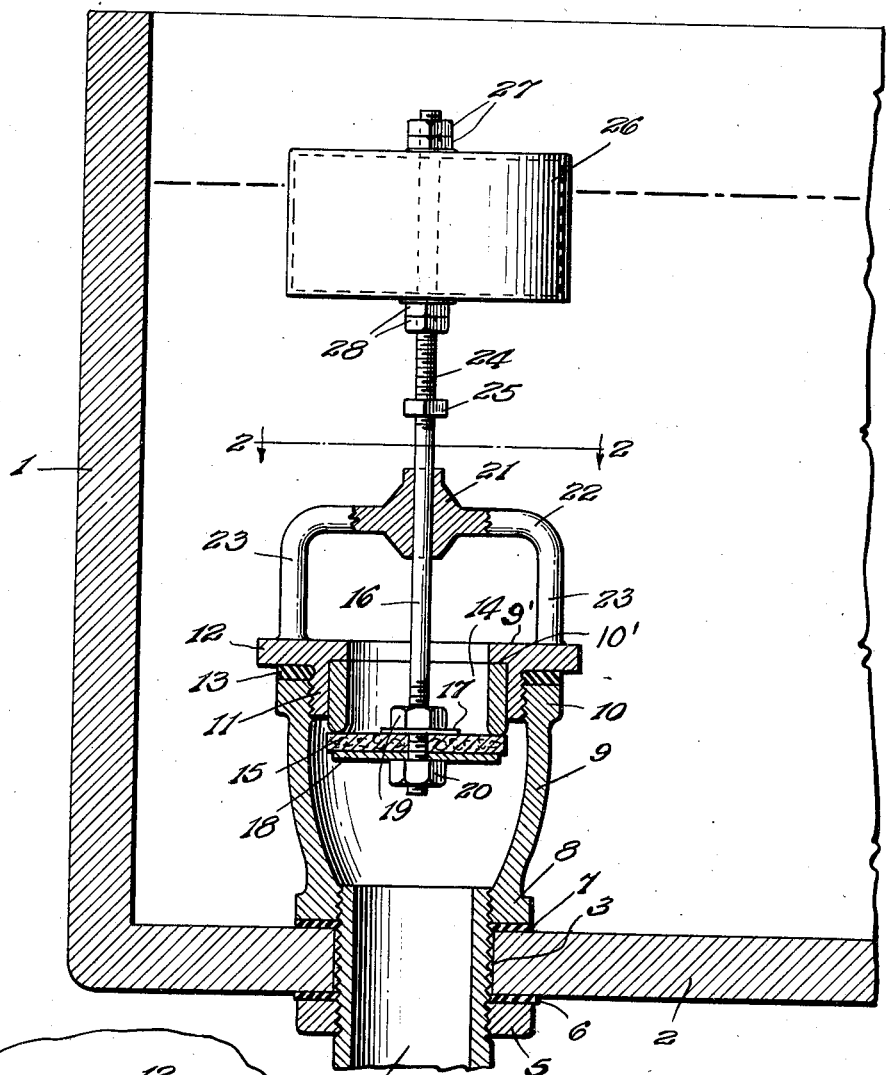
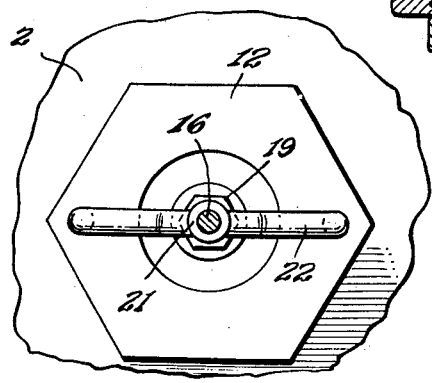
Inventors
R. H. Flutsch and
S. L. Martin.
By Lacey & Lacey,
Attorneys Patented Apr. 16, 1940

2,197,686

UNITED STATES PATENT OFFICE 2,197,686

FLOAT VALVE

Robert H. Flutsch and Steve L. Martin, Menard, Tex.

Application August 23, 1938, Serial No. 226,353

1 Claim. (Cl. 137—104)

This invention relates to a float valve which is particularly adapted for use in connection with a flush tank but may be used to control flow of water or any other liquid to a storage tank or similar reservoir.

One object of the invention is to provide a float valve including a coupling or valve housing adapted to be screwed into engagement with an end of a supply pipe extending into the tank and serve to mount the valve in a vertical position as well as serving to secure the end of the supply pipe through the bottom of the tank.

Another object of the invention is to provide a float valve wherein the valve housing has applied to its upper end a ring carrying an annular valve seat extending downwardly into the housing and also carrying a yoke constituting a guide for a stem carrying a float at its upper end and a valve disk at its lower end adapted to be moved into sealing engagement with the valve seat by upward movement of the float.

Another object of the invention is to provide a valve of this character wherein downward movement of the stem is limited by an adjustable abutment and wherein the float is so mounted upon the upper portion of the stem that it may be vertically adjusted thereon and firmly secured in an adjusted position. It will thus be seen that by vertically adjusting the float the extent to which the tank may be filled may be controlled and by limiting downward movement of the stem the valve disk at the lower end thereof may be prevented from moving downwardly to a position in which it will interfere with flow of liquid into the tank.

Another object of the invention is to provide a float valve of such construction that it may be very easily taken apart for cleaning or repairs.

The invention is illustrated in the accompanying drawing, wherein:

Figure 1 is a view showing the improved float valve in position for use, the view being principally in vertical section and partially in elevation, and Figure 2 is a view taken along the line 2—2 of Figure 1.

The tank 1 may be of any dimensions desired according to the use to which it is to be put. This tank has its bottom 2 formed with an opening 3 through which extends a pipe 4 leading from a suitable source of supply. A nut 5 is threaded upon the pipe under the tank in order to hold a sealing gasket 6 against the under face of the bottom 2 about the opening 3, and within the tank another sealing gasket 7 is fitted about the pipe so that, when the internally threaded lower end 8 of the valve housing 9 is screwed upon the protruding upper end of the pipe 4, the gasket 7 will be compressed and a tight joint provided which will prevent leakage from the tank about the pipe.

The valve housing 9 increases in diameter towards its upper end and has its upper end portion 10 externally thickened and internally threaded to receive the externally threaded neck 11 of an annular disk or cap 12 which is formed with flat wrench-engaging side edge faces, as shown in Figure 2, in order that it may be engaged by a wrench and the neck 11 screwed into the threaded upper end of the valve housing. The cap 12 is provided with a central opening surrounded by an inwardly extending flange 9' defining an annular stop shoulder 10'. A gasket 13 is provided about the neck between the cap and the upper edge face of the valve housing to provide a tight joint when the neck is screwed tightly into place. Within the neck is mounted a removable sleeve 14 formed of brass and having its upper end bearing against the stop shoulder 10' and its lower end portion projecting downwardly from the neck and terminating in a transversely rounded lower edge for engagement by a valve disk 15. It will thus be seen that the sleeve 14 constitutes an annular valve seat and when the valve disk is in engagement with the valve seat flow of liquid from the supply pipe 4 through the valve housing and out through the sleeve 14 into the tank will be shut off.

The valve disk 15 is disposed about the lower end portion of a stem 16 between upper and lower metal disks 17 and 18, and in order to firmly hold the valve disk and the metal disks or washers in place, there have been provided upper and lower nuts 19 and 20 which are in threaded engagement with the valve stem and when tightened will firmly clamp the valve disk and the washers between them. The stem 16 extends vertically and is slidably received through a guide 21 formed midway the width of a yoke 22. This yoke extends diametrically across the disk with its arms 23 extending downwardly and welded or otherwise firmly connected with the disk 12 which may be termed a cap for the valve housing. The upper portion of the stem is threaded and upon this threaded end portion 24 is mounted a nut 25 constituting an adjustable abutment and adapted to engage the upper end of the sleeve or guide 21 and limit downward movement of the stem. It will thus be seen that, while the stem may be moved downwardly to shift the valve disk away from the valve seat and allow liquid to flow from the valve housing out through the sleeve 14 and into the tank, the valve disk will be prevented from moving downwardly a sufficient distance to block the flow of water from the pipe 4. In order to move the stem upwardly and bring the valve disk into engagement with the valve seat, there has been provided a float 26 which is of hollow metal construction and fits about the stem between the upper and lower nuts 27 and 28. By adjusting the nuts the float may be shifted vertically along the upper portion of the stem and then firmly secured in a set position. Therefore, the extent to which the tank will be filled with water or other liquid before the valve disk is moved to its closed position against the valve seat may be controlled. When the outlet for the tank is opened in order to permit the liquid to flow out of the same, the float moves downwardly with the liquid and when the outlet is again closed the liquid from the source of supply will flow through the pipe 4 into the valve housing 9 and out through the sleeve 14 and the open center of the annular disk or cap 12 to replenish the supply of liquid in the tank. As the level of the liquid gradually rises, the float will be carried upwardly with it and during this upward movement the valve disk will be shifted upwardly until it engages the rounded lower edge of the valve seat. Flow of liquid into the tank will then be shut off. When it is desired to clean or repair the valve, it is merely necessary to unscrew the cap or disk 12 from the upper end of the valve housing and access may be had to the valve disk.

Having thus described the invention, what is claimed as new is:

In a valve of the character described, a valve housing having its lower end internally threaded for engagement with a pipe and its upper end also internally threaded, an annular disk having a depending externally threaded neck spaced inwardly from the periphery of the disk and screwed into the internally threaded upper end of said housing and provided with an internal annular stop shoulder, a gasket between said disk and the upper edge face of said housing, a removable sleeve in said neck having its upper end engaging the annular stop shoulder and its lower end portion projecting downwardly below the neck and constituting a valve seat, a yoke rising from the upper face of said disk and having its central portion spaced from and extending diametrically across the disk and formed with a tubular guide aligned with the axis of the sleeve, a stem slidable through said guide with its lower end portion extending through the sleeve and threaded, the upper portion of said stem being also threaded, a valve disk about the threaded lower end portion of said stem, washers engaging upper and lower faces of the valve disk, securing nuts carried by the threaded lower end portion of said stem and engaging said washers to firmly clamp the washers and the valve disk between the nuts, an abutment nut threaded upon the upper end portion of said stem for engaging the upper end of the guide and limiting downward movement of the stem, a float fitting about the upper portion of said stem, and securing nuts carried by said stem for engaging upper and lower portions of the float and securing the float in a set position upon the stem.

ROBERT H. FLUTSCH.
STEVE L. MARTIN.